United States Patent

Balakrishnan et al.

[11] Patent Number: 5,952,942
[45] Date of Patent: *Sep. 14, 1999

[54] METHOD AND DEVICE FOR INPUT OF TEXT MESSAGES FROM A KEYPAD

[75] Inventors: Sreeram Balakrishnan, San Francisco; Xixian Chen, Palo Alto; Yu Dong, Mountain View, all of Calif.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/754,453

[22] Filed: Nov. 21, 1996

[51] Int. Cl.$^6$ .................................................. H03K 17/94
[52] U.S. Cl. ................................ 341/20; 341/22; 341/28; 379/353; 379/354; 704/8; 704/10; 707/536; 364/705.01; 345/171
[58] Field of Search .................................. 341/20, 22, 28; 707/535, 536; 704/8, 2–4, 9, 10; 379/353, 354; 364/705.01, 709.12, 709.16; 345/168, 169, 171; 400/110

[56] References Cited

U.S. PATENT DOCUMENTS

| | | | |
|---|---|---|---|
| 4,375,922 | 3/1983 | Maegawa et al. | 400/110 |
| 4,689,743 | 8/1987 | Chiu | 341/20 |
| 4,868,779 | 9/1989 | Seto | 707/536 |
| 4,954,955 | 9/1990 | Chiu | 341/22 |
| 5,031,206 | 7/1991 | Riskin | 379/97 |
| 5,047,932 | 9/1991 | Hsieh | 400/110 |
| 5,063,376 | 11/1991 | Chang | 340/706 |
| 5,319,552 | 6/1994 | Zhong et al. | 707/535 |
| 5,617,314 | 4/1997 | Zhong | 707/535 |
| 5,623,682 | 4/1997 | Fukunaga | 707/536 |
| 5,634,134 | 5/1997 | Kumai et al. | 704/8 |
| 5,689,617 | 11/1997 | Pallakoff et al. | 395/2.64 |
| 5,713,033 | 1/1998 | Sado | 400/110 |
| 5,745,876 | 4/1998 | Kneser et al. | 704/255 |
| 5,765,133 | 6/1998 | Antoniol et al. | 704/355 |
| 5,818,437 | 10/1998 | Groverr et al. | 345/326 |

FOREIGN PATENT DOCUMENTS

| | | |
|---|---|---|
| WO90/02992 | 3/1990 | Australia . |
| 1015214 | 12/1991 | China . |
| 1092186 | 9/1994 | China . |
| 1029760 | 9/1995 | China . |
| 1120695 | 4/1996 | China . |
| 1121601 | 5/1996 | China . |
| 1133450 | 10/1996 | China . |
| 319193A2 | 11/1988 | European Pat. Off. ....... H04M 11/06 |
| 464726A2 | 6/1991 | European Pat. Off. ....... G06F 3/023 |
| 689122A1 | 1/1995 | European Pat. Off. ......... G06F 3/02 |

OTHER PUBLICATIONS

Arnott, John L. and Javed, Muhammad Y., "Probabilistic Character Disambiguation for Reduced Keyboards Using Small Text Samples", Argumentative and Alternative Communication Sep. 1992, pp. 215–223.

Witten, I. H. (1982), "Principles of Computer Speech" (pp. 247–249), London: Academic Press.

Horowitz, Ellis and Sahni, Sartaj, "Fundamentals of Data Structures in Pascal", Computer Science Press, pp. 512–520.

Cormen, Thomas H. et al., "Introduction to Algorithms", The MIT Press, pp. 469–471.

Pearl, Judea, "Heuristics; Intelligent Search Strategies for Computer Problem Solving", Addison–Wesley Publishing Company.

Ziran Input System User Manual, Ziran Software Limited.

Primary Examiner—Michael Horabik
Assistant Examiner—Timothy Edwards, Jr.
Attorney, Agent, or Firm—Hugh C. Dunlop

[57] ABSTRACT

A method of text entry into a device by activating keys of a keypad (16), where a key represents various characters. Input is delivered to a processor (30) corresponding to the keys activated. A dictionary (33) is searched for candidate combinations of characters corresponding to the keys activated. The candidate combinations are rank ordered, for example using language model data and feedback (14, 38) is provided to a user indicating at least a highest rank ordered candidate combination.

19 Claims, 6 Drawing Sheets

| 用 | 电 | 话 | 键 | 盘 | 输 | 入 | 汉 | 字 |
|---|---|---|---|---|---|---|---|---|
| YONG | DIAN | HUA | JIAN | PAN | SHU | RU | HAN | ZI |
| 9664 | 3426 | 482 | 5426 | 726 | 748 | 78 | 426 | 94 |

504 (top row), 500 (middle row), 502 (bottom row)

METHOD AND DEVICE FOR INPUT OF TEXT MESSAGES FROM A KEYPAD

FIELD OF THE INVENTION

This invention relates generally to a data entry method and apparatus, and more particularly to a method and apparatus for inputting text messages from a keypad, for example a numeric keypad.

BACKGROUND OF THE INVENTION

With the increasing desire to carry smaller and smaller personal communicating devices with optimum functionality such as pagers, cellular phones, and other personal communicator devices, and the desire to automate homes through combinations of telecommunications and cable where smart rooms will have one or more small devices that operate a variety of appliances or control a variety of applications; the need and desire to enter alphanumeric text through non-alpha or numeric keypad is ever increasing.

In the United States of America it is standard for every telephone keypad to have letters as well as numerals displayed on the keys. Thus, the key representing the numeral "2" has the letters A, B and C displayed and the key representing the numeral "3" has the letters D, E and F etc. It is common to represent a telephone number by the letters which correspond to the digits on the keypad. Thus, for example, a railway company with the name "Amtrack" can acquire the telephone number 268 7225 and can advertise to customers that the company's telephone number can be dialed by activating the keys with the letters A-M-T-R-A-C-K. Dialing these letters will result in only one digital sequence, but one digital sequence can be represented by many letter sequences.

In the telecommunications field, methods of name selection are known which use a numeric keypad. For example, it is known in a voice mail system to select a user's voice mailbox by keying in from a remote telephone the first few letters of a user's name, as a result of which a short digit stream is delivered to the voice mail system. The voice mail system compares the input digit stream with a limited set of options in a look-up table. Sufficient digits must be entered to uniquely identify the desired user. Similarly, automated customer service systems can use this form of text entry. For example an airline information system can request the first three letters of a destination airport and, notwithstanding ambiguities in the letters to be represented by the digits delivered, it can uniquely identify an airport from only three digits because it has a limited "dictionary" of airport names from which to seek a match. The same approach can be used in a telephone speed-dial look up arrangement. A name can be selected from a limited list of names stored in a telephone terminal and a number can be dialed associated with the name selected.

Various other approaches for entering alphanumeric input through a non-alpha, numeric only, or other type of keypad having fewer keys or buttons than the corresponding alphabet have been developed or are known. Many of these methods take advantage of the letters displayed on the standard US telephone keypad. However, often the methods associated with the alphanumeric text through the keypad are cumbersome and difficult to edit. In addition, typically the entry must be restricted or entered in a specific manner such that there is only one option per sequence of input. More specifically, there is a direct correlation for a specific input to a specific letter of the alphabet or a symbol. For example, if a user wants to input the word "call" through a non-alpha keyboard, the user has to enter a specific combination of numbers and/or symbols to indicate the word call. By way of example for a user to enter the word call the user must enter the following: 2\*\*\*; 2\*; 5\*\*\*; 5\*\*\*; #. Such a method of inputting is very restrictive, time consuming, and editing is difficult and slow.

Therefore a need exists to provide a user with a simple straightforward method and apparatus for inputting alphanumeric text through a non-alpha, numeric, or other keypad having fewer keys than the desired alphabet; and the need exists to provide a system that is not restrictive to direct correlation or a specialized domain, i.e. where a variety of choices are available and easily input.

Various preferred embodiments of the invention are now described, by way of example only, with reference to the accompanying drawings.

DETAILED DESCRIPTION OF PREFERRED EMBODIMENTS

Generally, a method is now described comprising the steps of: comparing input with dictionary and language model data stored in memory to generate at least one entry selected by probability of corresponding to the input; and providing user feedback of the entry having a likelihood of corresponding to the input.

Particularly, a method of text entry into a device is provided comprising the steps of: activating keys of a keypad, where a key represents a plurality of characters; delivering input to a processor corresponding to the keys activated; searching a dictionary for candidate combinations of characters corresponding to the keys activated; rank ordering the candidate combinations; and providing feedback to a user indicating at least a highest rank ordered candidate combination. Here, "character" refers generally to letters or to pictographic or grapheme characters.

It may be noted that the dictionary is searchable by combinations of characters, where the characters by which it is searchable are the same as the characters represented on the keys.

A method and apparatus are also described for input of text through a keypad having fewer keys than the number in the desired alphabet alone or in combination with numbers and other symbols. Recognition of the input is preferably correlated with the most likely text selection from a dictionary, language, or compilation of data having an unrestricted set of characters.

Language model data is preferably used to rank order the candidate combinations in order of probability, i.e. likelihood of usage in a given language. Such language model data preferably comprises character combination data. The character combination data comprises, for example, word unigram data, letter trigram data, or word bigram or trigram (or n-gram) data or, for example, in a Chinese or other pictographic or grapheme language version to be described, it may comprise pinyin letter trigram data, pictographic or grapheme character unigram data, pictographic or grapheme character bigram (or n-gram) data or word (i.e. pictographic or grapheme character combination) bigram (or n-gram) data and the like.

In a preferred embodiment, at least one likely entry can be displayed in a display area of a device and the at least one likely entry presented in the display area can be edited through input of a keypad.

Figure 1:
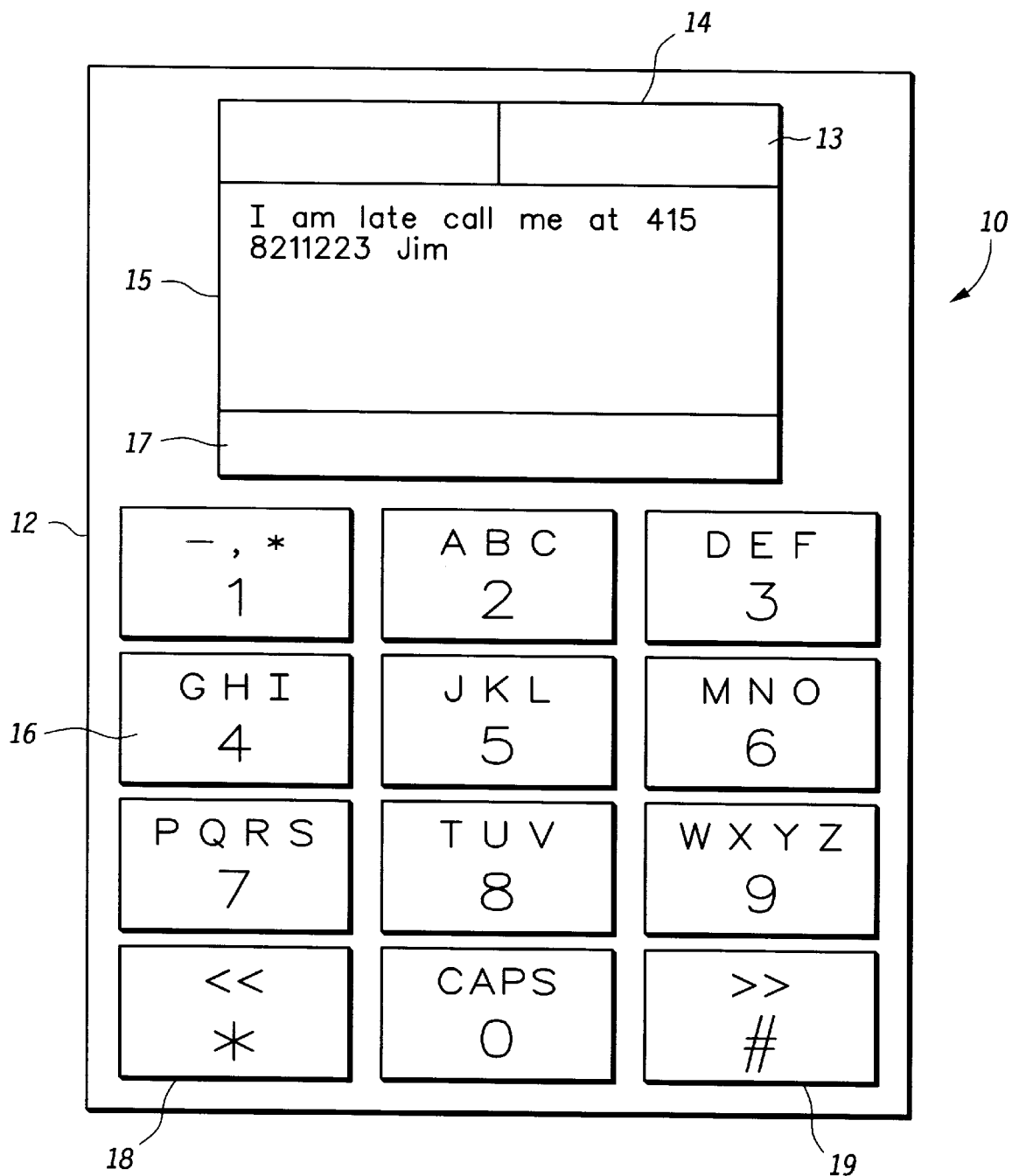
FIG. 1 is a front view of an illustrative text entry device suitable to receive input in accordance with the present invention.

Referring now to the figures, FIG. 1 illustrates a general and preferred embodiment of apparatus in accordance with the present invention. An example of a cellular telephone (or other data entry device such as a wireline telephone, pager or personal digital assistant or telecommunications device) having a keypad is illustrated as generally depicted by the reference numeral 10. The cellular telephone 10 depicted comprises a housing 12, a display 14 and a keypad 16 through which input is received. The display 14 has a text display area 15 and an area 17 for displaying word, letter combination or character alternatives. The keypad 16 has twelve keys with digits 0–9 displayed thereon in a standard layout. Also displayed in a standard layout are letters of the Roman alphabet A–Z. These letters can be arranged in other arrangements, for example for greater ergonomic efficiency, but the illustrated layout is preferred on account of established use. The key bearing the digit "1" has the punctuation marks "–", "?" and "*" displayed thereon. The lower left hand key 18 has the symbols "<<" (meaning "backspace" or "scroll left" as is explained below) and * (referred to as "star"). The lower right hand key 19 has the symbols ">>" (meaning "enter" or "scroll right" as is explained below) and "#" (referred to as "pound").

In the preferred embodiment illustrated, the English alphabet is used. Alternatively, various other alphabets may be used in accordance with the preferred embodiments of the present invention, such as Chinese phonetic alphabets or Russian or Asian alphabets. In the preferred embodiment of the present invention illustrated in the figures, the input device is a keypad having fewer individual keys than the number of letters in the alphabet. Therefore, the alphabet is separated into various sequences where a single numeral and a series of letters or symbols are represented on a single key, or block of input, of the keypad or other input device. Pressing of a key delivers a digit, but the digit can represent one of a plurality of letters or characters.

Figure 2:
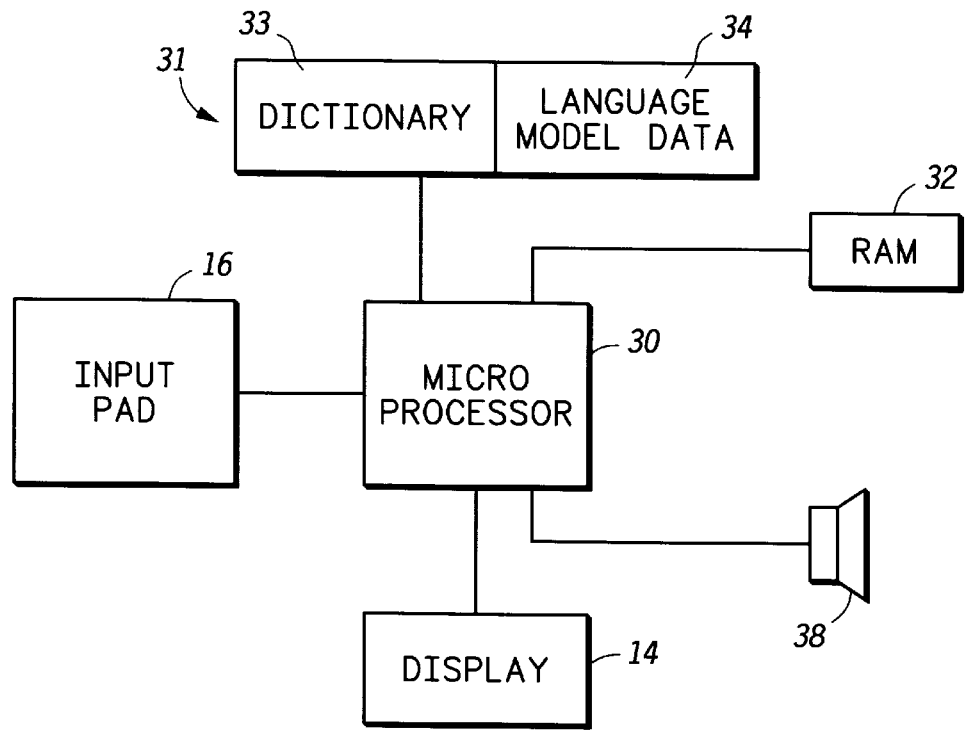
FIG. 2 is a block diagram detailing internal circuitry of the device of FIG. 1.

Referring to FIG. 2, the cellular telephone 10 is illustrated as having a microprocessor 30 coupled to the input pad 16 and to the display 14 using standard input and output drivers as are known in the art. Also coupled to the microprocessor 30 are a first memory 31 which is preferably electrically-erasable read-only memory (EEPROM) and a second memory 32 which is preferably random access memory (RAM). In the EEPROM memory is stored a dictionary 33. The dictionary 33 includes, for an English language data entry device, English words and letter trigrams. The language model data 34 includes unigram weight values for the words and letter trigrams stored in the dictionary. Optionally the data 34 also includes word bigram and even word trigram data. Other language model information can be stored with unigram weight values 34. An optional loudspeaker 38 is shown coupled to the microprocessor.

Figure 3:
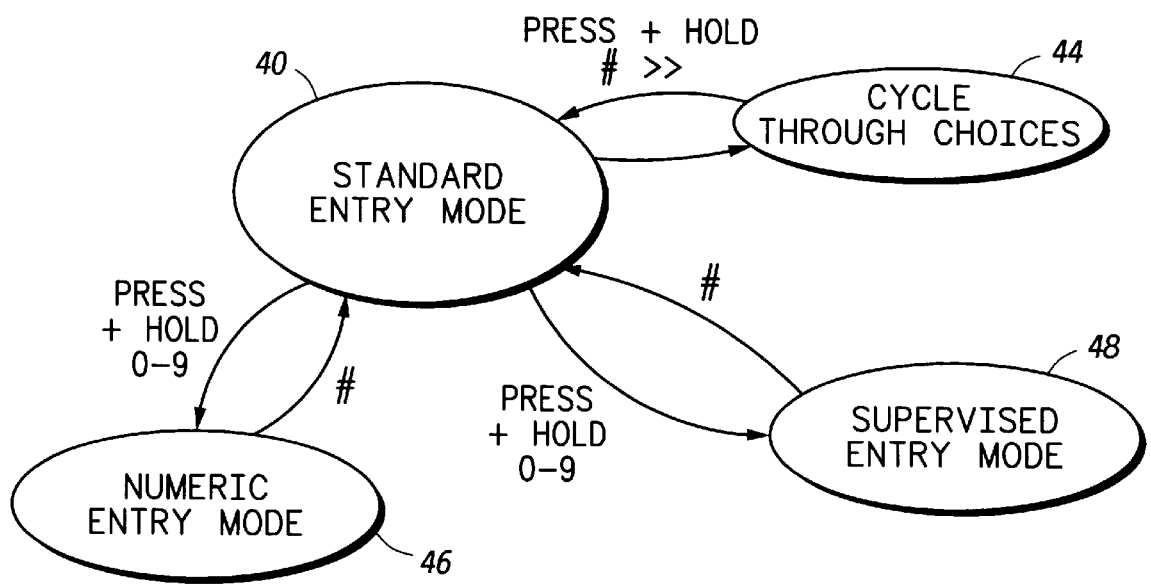
FIG. 3 is a state diagram illustrating operation of the device of FIG. 1 in accordance with a first embodiment of the invention.

Referring to FIG. 3, the microprocessor 18 is shown as having three principal modes of operation for data entry (it may have many other modes and functions not relevant to the present invention). The first principal mode of data entry is standard entry mode 40 and associated with this mode is cycle mode 42. The other modes of data entry are numeric entry mode 46 and supervised entry mode 48. Standard entry mode 40 is now described in detail, with the other modes being described later.

Figure 4:
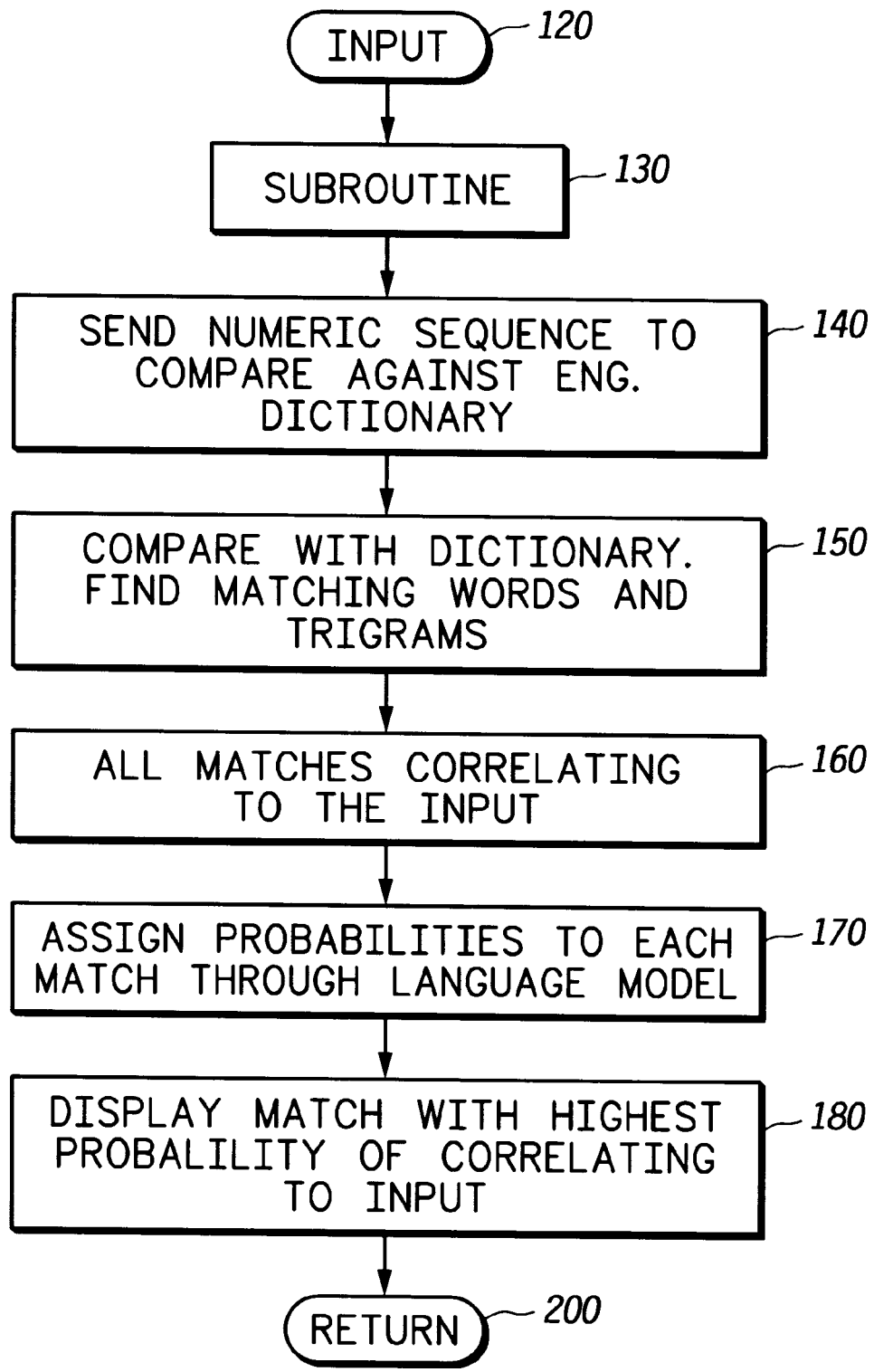
FIG. 4 is a flow diagram illustrating operation of the device of FIG. 1 in a principal entry mode of FIG. 3.

Referring now to FIG. 4, a flow diagram of a preferred embodiment of recognizing alphanumeric input in standard mode through a non-alpha or numeric keypad is illustrated. The example will be considered where the digit sequence 2 2 5 5 is entered. As illustrated, the first input digit "2" is received in step 120 by pressing briefly and releasing the corresponding key . Subroutine 130 will be disregarded for the present as it relates only to entry of "#>>" and "<<*". In step 140 the numeric sequence entered so far is sent on to the next step for comparison against the contents of the dictionary 33. Thus, each entry is appended by microprocessor 30, as it is received, with previously entered digits and the various possible corresponding letters are compared in step 150 with words from the dictionary 33.

The first digit "2" can correspond to A, B or C. The comparison of step 150 will search for words and (optimally) letter trigrams beginning with the letters A, B or C. In the case of the first entered digit, all three options (A, B and C) are possible first letters of a word and step 150 determines positively that at least one match is found. (Note that if step 150 reveals no candidate words then step 155 instead looks for candidate letter trigrams). In step 160 all possible matches correlating to the input are identified and kept active for further steps in the process. In step 170, probabilities are assigned to the active matches using the language modeling data 34 and in step 180 the active match or matches with the highest probability are displayed in display area 17. In the case where only one digit has so far been entered, there is sufficient space in display area 17 to display all three active matches A, B and C. In step 200 the program returns to step 120 and awaits the next digit input.

When a second input "2" is received, the comparison 150 will now yield words and trigrams beginning with AA, AB, AC, BA, BB, BC, CA, CB, and CC. If a third input, 5, is received, the comparison 150 could potentially yield entries beginning with AAJ, AAK, AAL, ABJ, ABK, ABL, BAJ, BAK, BAL, BBJ, BBK, BBL, BCJ, BCK, BCL, CAJ, CAK, CAL, CBJ, CBK, CBL, CCJ, CCK, and CCL, but some of these trigrams may not appear in the English language and will be omitted by step 150. If a fourth input, 5, is received, words beginning with AAJJ, AAJK, AAJL, AAKJ, AAKK, AAKL, AALJ, AALK, AALL, ABJJ, ABJK, ABJL, ABKJ, ABKK, ABKL, ABLJ, ABLK, ABLL, BAJJ, BAJK, BAJL, BAKJ, BAKK, BAKL, BALJ, BALK, BALL, BBJJ, BBJK, BBJL, BBKJ, BBKK, BBKL, BBLJ, BBLK, BBLL, BCJJ, BCJK, BCJL, BCKJ, BCKK, BCKL, BCLJ, BCLK, BCLL, CAJJ, CAJK, CAJL, CAKJ, CAKK, CAKL, CALJ, CALK, CALL, CBJJ, CBJK, CBJL, CBKJ, CBKK, CBKL, CBLJ, CBLK, CBLL, CCJJ, CCJK, CCJL, CCKJ, CCKK, CCKL, and CCLJ, CCLK, and CCLL are possibilities to be searched in the dictionary (less any combinations ruled out in the previous round of comparison). From this list of all combinations, the dictionary is compared and any matches are identified in step 150. In the example presented, the entries with matches found in the dictionary are BALK, BALL, CALK, and CALL.

Alphanumeric recognition data can be stored in the memory 31.

In the preferred embodiment, the dictionary 33 represents a plurality of words or symbols and is preferably stored as a trie, as is described in "Fundamentals of Data Structures in Pascal" by E. Horowitz and S. Sahni, published by Computer Science Press, pages 512–520. The input is compared against the dictionary and preferably as each input is received the comparison is continually updated. In a preferred embodiment, a comparison that will not yield a match is eliminated and that combination and any and all further combinations that include that combination are also then ignored or eliminated. For example purposes only, if a first and a second input are 2 2, and the comparison with the dictionary yields BB, and the dictionary does not have any entries that would match BB, all further input that would begin with BB combinations is eliminated or ignored. For example, if the third is 5, such that the input now is 2 2 5, all the entries such as BBJ, BBK, BBL, etc. are ignored or eliminated and not compared to the dictionary.

In accordance with a preferred embodiment of the present invention, a breadth-first search is used to accelerated the comparison of the input to the stored dictionary entries. Advantages of this type of search are that it reduces the time for comparison and provides results with a greater accuracy of correlating to the input. Breadth-first searches are described in "Heuristics—Intelligent Search Strategies for Computer Problem Solving" by Judea Pearl, published by Addison-Wesley Publishing Company, page 42 et seq. and "Introduction to Algorithms" by Thomas H. Cormen et al., published by M.I.T. Press and McGraw-Hill at page 469 et seq.

In a preferred embodiment of the present invention, the dictionary whose contents are stored as a trie is searched using a beam search. Various techniques for beam searches are known in the art. For present purposes, a beam search is a breadth-first search with limited breadth, where only, say 100 possible matches are considered at any moment. This feature is particularly advantageous because spelling errors are permitted. Preferably, a restriction is established limiting the number of alternatives that will be searched.

More preferably, a restriction is established which restricts or eliminates all alternatives from the dictionary that are returned which fall below a predetermined "score." The score that is selected will vary depending upon the parameters that are determined to be the most significant for the application for which the invention is being used. In a preferred embodiment, an alternative receives a high score if the entry corresponds to an entry in the dictionary. If, however, the alternative does not correspond to an entry in the dictionary, the alternative is given a low score.

More preferably, each alternative that does not match an entry in the dictionary is eliminated. Preferably, for each alternative that does match an entry in the dictionary, the alternative is compared to a unigram language model to determine the frequency of occurrence of that alternative.

In the preferred embodiment, all input that matches or corresponds to an entry in the dictionary at step 150 of FIG. 4 is returned to the memory 32. In many instances, there are too many possible matches for all matches to be displayed in alternatives display area 17. Moreover, presenting a user with a large number of alternatives is ergonomically inefficient. For these reasons, a language model is used in step 170 to assign a probability to each of the matched entries identifying the likelihood that the entry corresponds to the intended input. Preferably, step 170 causes the entry with the highest probability of correlating to the alphanumeric input to be displayed in area 17 of the display 14 of the device 10. This is achieved by looking up and comparing unigram weighting values from language model data 34 (and/or other language model data) for the different candidate alternatives and selecting the most likely candidates (e.g. four candidates or some other number up to, preferably, a maximum of 10 candidates).

An advantage of the present invention is that it allows for ambiguous input and converts that input to a word or alphanumeric value that has the highest probability or likelihood of correlating to the input.

Figure 5:
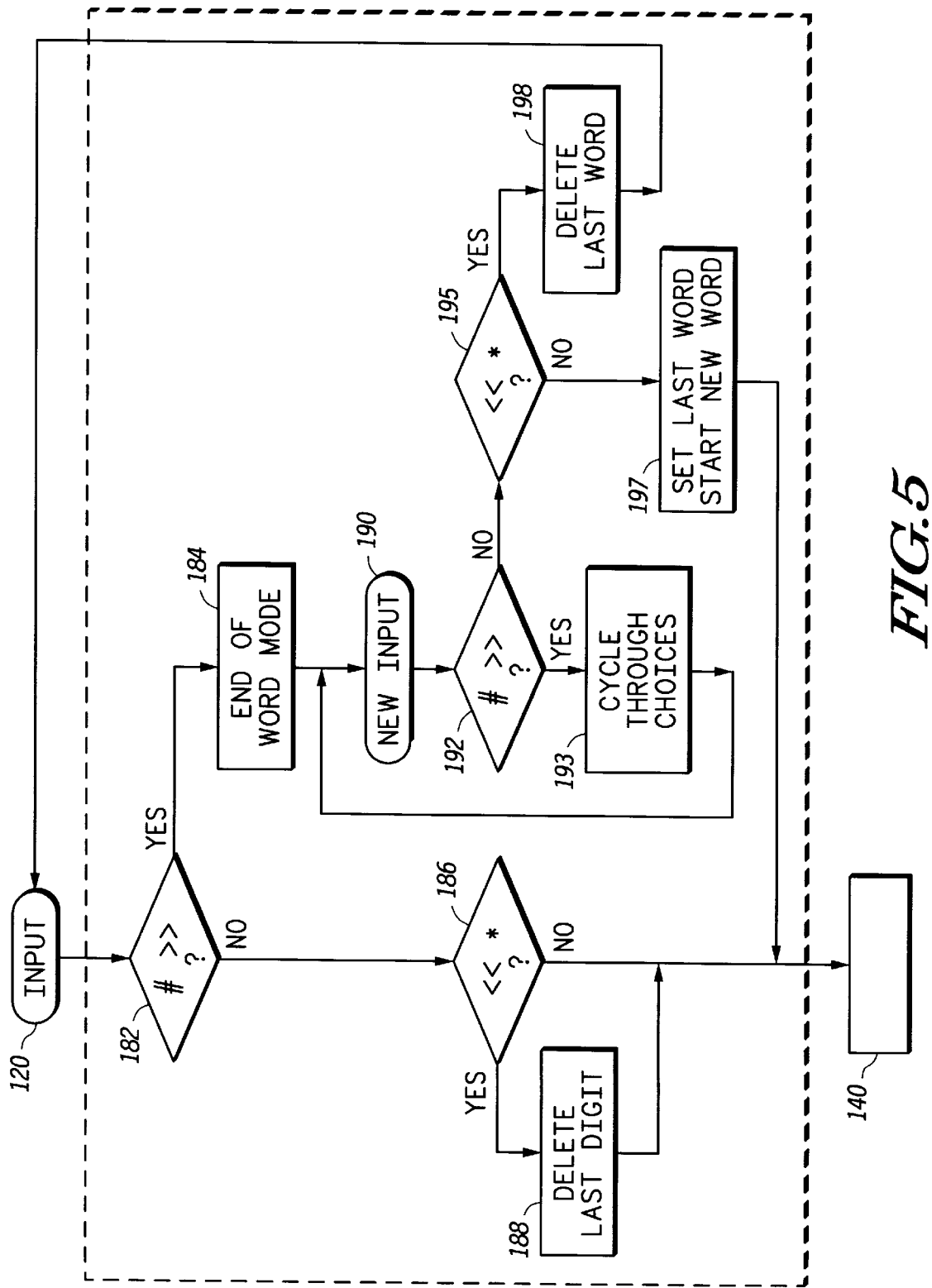
FIG. 5 is a flow diagram illustrating further details of the operation of FIG. 4.

Referring now to FIG. 5, details of the subroutine 130 of FIG. 4 are shown.

If, following entry of one or more digits, and display of the candidate matches on display area 17, key 19 is pressed, bearing the markings "#>>" the program proceeds to step 184. Step 184 represents the commencement of an end-of-word mode, terminating the entry of the current word and causing it to be displayed in text display area 15 followed by a space.

At this point in the process, the highest priority match is displayed in alternatives display area 17 of display 14. The program awaits new date entry at step 190. If the word or character displayed in display area 17 (the highest ranked match) is not the desired word or character—e.g. if CALL is displayed, but BALL is desired, pressing (briefly) and releasing key 19 (#>>) causes step 193 to cycle to the next choice. With each press of key 19, steps 192 and 193 cause the next rankordered choice to be displayed in alternatives display area 17 and in text display area 15 (eventually returning to the original highest rank-ordered choice). If, in step 190, the input key 18 (<<*) is pressed, step 198 causes the entire sequence of digits since the last space (the entire word or character) to be deleted and the program recommences at step 120, where a new input can be received and the word can be re-entered. If the entry at step 190 is neither of keys 18 and 19 then logically it must be another of the keys of keypad 16, representing a digit 0–9 and step 197 is reached. This entry is interpreted to be the start of a new word or character. In step 197 the end-of-word mode ends and a new word (or character) begins. The program proceeds to step 140 for processing of the new digit stream representing the new word or character.

Other steps can be introduced. For example press-and-hold activations of various keys during the execution of steps 182–198 can be given additional meanings and functions.

If, following step 120, key 18 is pressed, step 186 causes the program to proceed to step 188 and the last digit entered is deleted. The program then continues with step 140 and the numeric sequence so far entered (omitting the last digit) is delivered to comparison step 150 for processing as before.

It will, of course, be appreciated by one of ordinary skill in the art of computer programming that the steps illustrated in FIGS. 4 and 5 can be implemented in many different forms and do not have to be implemented in the sequences shown.

If at any time in mode 40 (except between steps 184 and 195) the desired word to be entered in the text display area 15 is not the highest priority word, key 19 can be pressed down and held down for a predetermined time (e.g. 1.5 seconds) and this will cause cycle mode 44 (FIG. 3) to operate and the candidate matches in display area 17 will cycle through (cycling to the left if more than one is displayed). Upon release of the respective button, standard entry mode 40 resumes. Pressing-and-holding of key 19 between steps 184 and 195 can be given a different meaning (because pressing and releasing that key at that time already operates the function of cycling through the choices). It is preferred that here pressing-and-holding key 19 has the effect of entering a space in text display area 15.

When the desired word is displayed in the left-most position in the display area 17, it can be selected by pressing key 19 briefly (less than the predetermined time) and releasing it. This action delivers the word to memory 32 and to text display area 15 as described above.

If the display area 17 is small in comparison to the length of the candidate matches, there may be only one candidate displayed at one time and key 19 will cause the next candidate (in rank order of likelihood of selection) to be displayed.

The standard mode of text entry 40 described and illustrated in FIGS. 4 and 5 allows for very fast text entry from multiplexed keys where each key represents a plurality of letters or characters. For example, 65% of English text is written using only 100 words. 91% of these words can be entered without having to use keys 18 and 19 to scroll beyond the first presented match. Thus the arrangement described comes close to meeting a goal of one keystroke entry per letter.

Where the words to be entered are all included in the dictionary standard entry mode 40 (and associated modes 42 and 44) can be used continuously to enter text.

In alternative embodiment of standard entry mode 40, a bigram language model (two-word combination model) is used to determine the frequency of two consecutive words occurring together and to rank order the candidate matches accordingly. This embodiment, however, can require a large memory 31, especially when operating in the English language, on account of the very large number of possible bigrams. A trigram language model can be used to determine the frequency of three words occurring together.

In accordance with preferred features of the present invention, alternative data entry modes are provided.

Numeric entry mode 46 can be entered by pressing and holding a key corresponding to the digits 0–9. Upon pressing and holding one of these keys, the different multiplexed characters (digit and letters) are displayed in cyclic order in the display area 17. For example pressing and holding the "2" key causes the characters A-B-C-2-A-B-C-2 to be displayed in sequence (or 2-A-B-C etc.). If the key is released while a numeral is displayed, numeric entry mode 46 is activated. If it is released while a letter is displayed, supervised entry mode 48 is activated.

Once numeric entry mode 46 is activated, every subsequent key press is assumed to be a number, until key 19 is pressed. Thus the number 8211223 shown in FIG. 1 can easily be entered by one long press of key "8" followed by a short press of each of the subsequent keys.

Upon pressing key 19 the program returns to standard data entry mode 40.

When supervised data entry mode 48 is entered, each subsequent letter can also be entered by a similar press-and-scroll method of letter selection (as is known in the art).

As a preferred alternative, supervised data entry mode 48 operates in the same way as standard entry mode 40 but uses only letter trigrams to select the next candidate character. When key 19 is pressed, supervised data entry mode ends, the displayed (or in the preferred alternative the highest priority displayed) word is stored in memory 32 and displayed in text display area 15 and the program returns to standard entry mode 40. Supervised entry mode is particularly useful for entry of words not included in the dictionary 33 and for entry of names In the embodiment described above, a predetermined key (e.g. "#") is preferably to select and enter the highest rank ordered candidate combination.

A memory (e.g. EEPROM 31 or a separate computer disk) can be provided having instructions and data stored therein that, when executed, cause the microprocessor 30 to comprise: an input; a dictionary 33; language model data 34; a search algorithm 150, to search the dictionary for candidate combinations of characters corresponding to digits received at the input (input from input pad 16); a rank ordering function 170 that rank orders the candidate combinations according to the language model data; and an output (to display 14 or loudspeaker 38) to provide feedback indicating at least a highest rank ordered candidate combination.

There now follows a description of how the above embodiment of a data entry device can be modified for very simple and fast entry of Chinese characters. In this embodiment it is preferred (but not essential) that one of a plurality of keys (e.g. 0–9) is activated to select and enter one of a plurality of rank ordered candidate combinations.

Since the mid 1950s, a standard phonetic representation of Chinese characters has been adopted known as "pinyin". The pinyin for each Chinese character, like each English word, is made up from combinations of the 26 letters of the Roman alphabet A–Z.

So a pinyin based Chinese keypad data entry device can have the same keypad layout as that shown in FIG. 1. The mapping table of telephone digit keys and 26 English letters is as shown in FIG. 1. (Alternatively the digits 7 through 0 can represent <p r s>, <t u v>, <w x y>, <q z> respectively or digits 7 through 9 and digit 1 can represent <p r s>, <t u v>, <w x y>, <q z> respectively.)

Figures 6, 7:
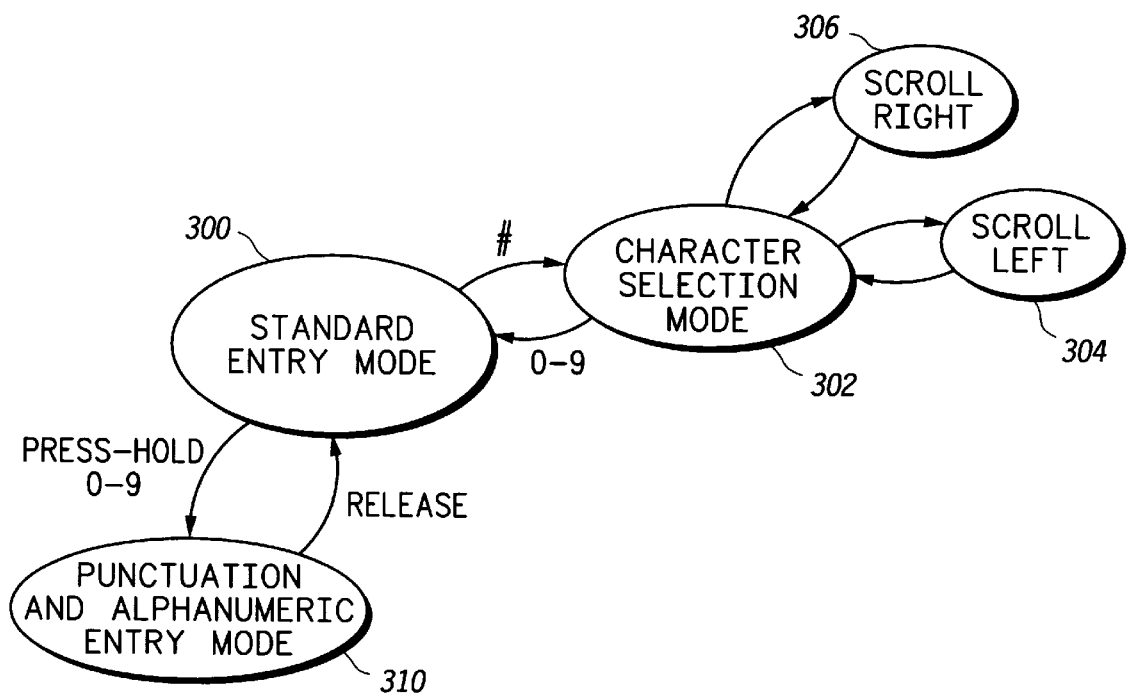
FIG. 6 is a state diagram illustrating operation of the device of FIG. 1 in accordance with an alternative embodiment of the invention.
FIG. 7 is an example of nine pinyin entries with corresponding digit streams and examples of selected Chinese characters which can be entered by operation of the alternative embodiment of the invention.

Referring to FIG. 6, a mode diagram for a program operated by microprocessor 30 is shown for this embodiment of the invention. There is a standard entry mode 300 with an associated character selection mode 302. Character selection mode has scroll left and scroll right modes 304 and 306 as sub-modes. An alternative alphanumeric entry mode 310 is provided In standard entry mode 300, a user enters the pinyin of each Chinese character he wants to input by using the telephone keys marked a,b,c,d, . . . in the same manner as described above with respect to entry of English words. (For verification, a digit string is displayed in a small window 13 which is located at the top right of the display 14). He can press key 18 to delete a digit that is wrong. When finished, he presses key 19. The program then proceeds to character selection mode 302 and displays in character selection area 17 of the display the top 10 Chinese characters that have the pinyin entered. The characters are rank ordered based on the language model data 34. A number from 0 to 9 is displayed under each Chinese character. The user can select the Chinese character he wants to input by pressing its corresponding number displayed. For example, if the Chinese character marked by 3 is the desired one, he simply presses the key marked by 3 nto put it in the text area 15 of the display 14 and store it in memory 32. The program then returns to standard entry mode 300.

If the user can not find the Chinese character he wants to input in the display area 17, he can press key 19 again, then mode 304 of the program gives a list of another 10 characters and these are displayed in display area 17. The user can revert to the previous list of 10 characters by pressing key 18 to activate mode 304. Since the dictionary 33 contains every possible Chinese character, the user can always find the right character he wants to input.

If the pinyin the user entered is not a legitimate pinyin of a Chinese character, the system displays nothing and gives a beep through the loudspeaker 38 or leaves the digit stream displayed unchanged in window 13 and gives a beep.

Once the user has entered the pinyin followed by "#" key 19, the two editor keys "*" and "#" become the selecting keys for the top 10 candidate list, one is forward, the other is backward. The user must make his selection by pressing one of 10 telephone digit keys even if he can not find the Chinese character he wants to input. This returns the operation to standard entry mode 40 and key 18 can be used to delete the entered character and start again with pinyin entry for the desired character.

An example of nine pinyin entries, with corresponding digit streams 502 and examples of selected characters 504 corresponding to those pinyin entries is shown in FIG. 7.

There are four frequently used punctuation marks ",", ".", "?", "!" marked in key 1. The system uses the press/hold mode to enter one of them. When the user wants to input the punctuation, he presses and holds key 1. The program enters mode 310. Then the digit 1 and the four punctuation marks ",", ".", "?", "!" are then displayed on the screen one by one. The user can select the punctuation he wants to input by release key 1 when it is being displayed.

In a manner similar to the input of punctuation, alphanumeric entry mode 310 is entered in a press/hold manner to enter digits and Roman letters. For example, if the user wants to enter the Roman character M, he presses and holds key 6 which is marked by M, N, 0. The system then displays digit 6, the small cases of these three characters and the capital cases of these three characters one by one. The user then releases the key when he sees the character M on the screen.

Figure 8:
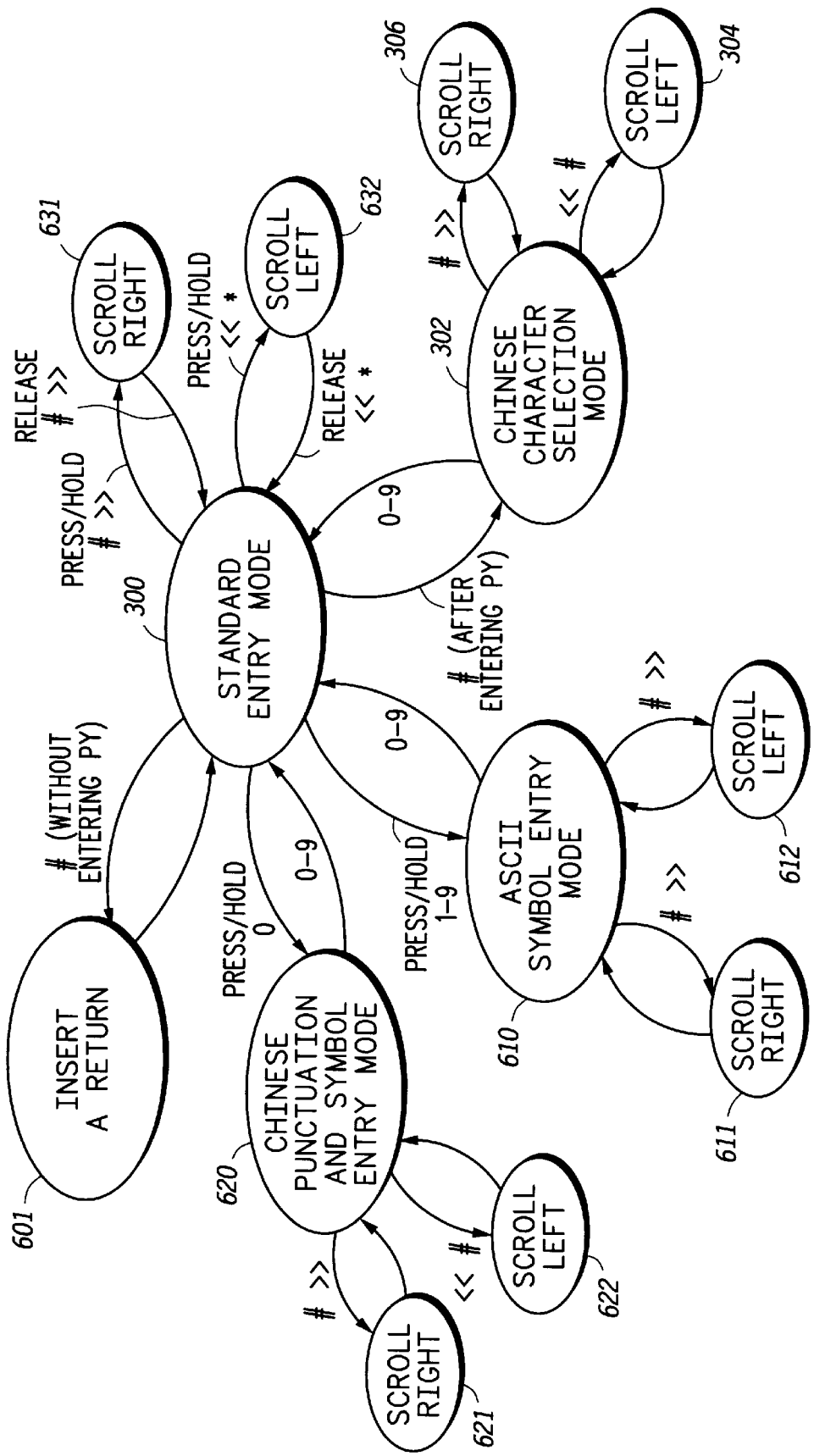
FIG. 8 is a state diagram alternative to that of FIG. 6.

Referring to FIG. 8, a state diagram alternative to that of FIG. 6 is shown. In this diagram, standard entry mode 300 as well as Chinese (or other pictographic or grapheme) character selection mode 302 and scroll right and scroll left modes 304 and 306 are unaltered. Mode 310 of FIG. 6 is split into two alternative modes in FIG. 8, these being Chinese punctuation and symbol mode 620 and ASCII symbol entry mode 610. Mode 620 is reached from mode 300 by pressing and holding key "0". Mode 610 is reached from mode 300 by pressing and holding one of keys "1–9". These modes 620 and 610 have respective scroll right and scoll left modes 621, 622, 611 and 612 similar to modes 306 and 304. Additionally insert return mode 601 is provided which is reached from mode 300 by pressing key 19 (#) without first entering any pinyin. Mode 302 is, in FIG. 8, only reached by pressing key 19 (#) after entering pinyin. Modes 631 and 632 are added (scroll right and scroll left respectively) which can be reached from mode 300 by pressing and holding respective keys 19 and 18 for a predetermined time (e.g. 1.5 seconds).

Mode 620 is useful because, in Chinese, there are about 500 punctuation and other symbols that do not form parts of words, but stand alone. These can be selected by pressing "0" and scrolling left or right to select the desired symbol.

The system uses key 0 to enter Chinese punctuation marks and other Chinese symbols, such as space, slash, etc. In standard mode 300, when pressing and holding key 0 for a predetermined time (e.g. 1–5 seconds), the program enters the Chinese punctuation and symbol entry mode 620 and displays in character selection area 17 of the display digit 0, space, punctuation marks, and other symbols.

$$\text{E.g.:} \frac{0, .: ! ?(\ )\%}{0123456789}$$

A number from 0 to 9 is displayed under each symbol (or item). The user can select the Chinese symbol he wants to input by pressing its corresponding number displayed. If the user cannot find the symbol he wants to input, he can press key 19, then mode 620 of the program gives a list of another 10 Chinese symbols and these are displayed in the display area 17. The user can revert to the previous list of 10 symbols by pressing key 18 to activate mode 620. There are more than 600 Chinese symbols.

The system uses keys 1–9 to enter ASCII symbols, which include English alphanumerics, punctuation marks, and other symbols. In standard mode 300, when pressing/holding key 1 for a predetermined time (e.g. 1–5 seconds), the program enters mode 610 and displays digit 1, space, punctuation marks, and other ASCII symbols.

$$\text{E.g.:} \frac{1, .?!-\$\#@}{0123456789}$$

A number from 0 to 9 is displayed under each symbol (or item). The user can select the ASCII symbol he wants to input by pressing its corresponding number displayed. If the user cannot find the symbol he wants to input, he can press key 19, then mode 610 of the program gives a list of another 10 ASCII symbols and these are displayed in the display area 17 The user can revert to the previous list of 10 symbols by pressing key 18 to activate mode 610.

Other digits and Roman letters can also be entered in a press/hold manner. For example, if the user wants to enter Roman character M, he presses and holds key 6 which is marked by M, N, O. The system then enters mode 610 from mode 300 and displays digit 6, the small and capital cases of English letters m, n, o, like this 6*mno*MNOExit

01234567

The user can then select the capital letter M by pressing key 4 and the program returns mode 600. If the user accidentally presses and holds the keys 2 to 9, and he does not want to enter any Roman letters, he can press key 7 to return to the standard mode 300 without entering any Roman letters.

Mode 601 allows a carriage return to be entered between words or characters. Mode 632 is the same as mode 44 in FIG. 1 and mode 631 is similar.

The arrangement of FIGS. 1, 2 and 6 or 8 can be used to enter text using Zhuyin phonetic Chinese symbols instead of pinyin (lower case Roman) symbols, by suitably displaying the 37 Zhuyin phonetic Chinese symbols on 10 telephone keypad keys and suitably providing matching dictionary and language model data.

It will be apparent to those skilled in the art that the disclosed invention may be modified in numerous ways and may assume many embodiments other than the preferred forms particularly set out and described above. For example, instead of providing a display 14 and user feedback through area 17 of the display, synthesized voice can be output through the speaker 38 to provide user feedback of a candidate match. Additionally, the input pad 16 and loudspeaker 38 can be remote from the microprocessor 30 and its memories 31 and 32, providing remote data entry. This arrangement is particularly useful for allowing a standard telephone handset to be used for text entry, for example for entering paging messages to a paging system from a remote location. Accordingly, it is intended by the appended claims to cover all modifications of the present invention that fall within the true spirit and scope of the present invention and its equivalents.

What is claimed is:

1. A method of text entry into a device comprising the steps of:

activating keys of a keypad, where a key represents a plurality of characters in a first alphabet;

delivering input to a processor corresponding to a set of plural keys activated;

searching a dictionary for a set of alternative characters in a second alphabet, each alternative character ambiguously corresponding to the set of plural keys activated, to thereby provide candidate second alphabet characters;

rank ordering the candidate second alphabet characters utilizing language model data indicative of likelihood of usage in a given language to order the candidate second alphabet characters in order of probability; and providing feedback to a user indicating at least a highest rank ordered candidate second alphabet character.

2. The method of claim 1, further comprising the step of activating a predetermined key to select and enter the highest rank ordered candidate second alphabet character.

3. The method of claim 1, further comprising the step of activating one of the keys of the keypad to select and enter one of a plurality of rank ordered candidate second alphabet characters.

4. The method of claim 1, wherein the language model data comprises unigram data.

5. The method of claim 1, wherein the language model data comprises letter trigram data.

6. A device comprising:

a keypad, said keypad having an input area of discrete keys, each key representing plural characters in a first alphabet, and a display area, said input area configured to generate numeric input upon activation of the keys;

display processing circuitry for presenting a graphical image of a second alphabet ideographic character on the display;

a memory having at least alphanumeric recognition data stored therein; and digital processing circuitry for comparing the numeric input with the alphanumeric recognition data and for rank ordering the candidate second alphabet characters utilizing probability data indicative of likelihood of usage in a given language to order the candidate second alphabet characters in order of probability to provide to the display processing circuitry candidate recognition information including at least one likely candidate second alphabet ideographic character having a highest probability of corresponding to the numeric input value.

7. A method comprising the steps of:

receiving input data from a keypad area of a device having a set of keys, each key representing a plurality of characters such that activation of a key generates an ambiguous input signal having a probability of representing any one of the plurality of characters for that key;

comparing the input data with a dictionary and word bigram language model data to identify at least one likely entry likely to represent the input data; and displaying the at least one likely entry in a display area of said device.

8. A method comprising the steps of:

comparing input data received from a keypad area of a device with a dictionary, the keypad area comprising a set of keys, each key representing a plurality of characters such that activation of a key generates an ambiguous input signal having a probability of representing any one of the plurality of characters for that key;

identifying candidate words from the dictionary corresponding to the input data;

identifying, using word bigram language model data, at least one likely candidate word having a highest probability of representing the input data;

storing the at least one likely candidate word in memory;

displaying the at least one likely candidate word in a display area of the device; and editing the at least one likely candidate word presented in the display area through input of the keypad area.

9. A method of processing keypad entry into alphanumeric text, comprising the steps of:

receiving input as a sequence of numeric values;

converting the sequence of numeric values to at least one alphanumeric unit;

comparing the at least one alphanumeric unit with a dictionary to identify candidate words likely to represent the input;

assigning through word bigram data a probability to each of the candidate words; and displaying a candidate word having a highest probability.

10. A device comprising:

a keypad, said keypad having an input area and a display area, said input area configured to receive numeric input;

display processing circuitry for presenting a graphical image on the display;

a memory having at least alphanumeric recognition data, including word bigram data stored therein; and digital processing circuitry for comparing the numeric input with the alphanumeric recognition data to provide to the display processing circuitry candidate recognition information including at least one likely candidate word having a highest probability of corresponding to the numeric input value, as determined by the word bigram data.

11. A method of text entry into a device comprising the steps of:

activating keys of a keypad, where a key represents a plurality of characters and activation of each key generates an ambiguous input signal having a probability of representing any one of the plurality of characters for that key;

delivering input to a processor corresponding to the keys activated;

searching a dictionary for words corresponding to the keys activated to provide candidate words;

rank ordering the candidate words utilizing word bigram language model data to order the candidate words in order of probability; and providing feedback to a user indicating at least a highest rank ordered candidate word.

12. The method of claim 11, further comprising the step of activating a predetermined key to select and enter the highest rank ordered candidate word.

13. The method of claim 11, further comprising the step of activating one of the keys of the keypad to select and enter one of a plurality of rank ordered candidate words.

14. A text entry device comprising: a keypad having a set of keys, each key representing a plurality of characters such that activation of a key generates an ambiguous input signal having a probability of representing any one of the plurality of characters for that key; a dictionary; word bigram language model data; an output device; and a processor coupled to the keypad, dictionary, language model data and output device, the processor being programmed to receive input corresponding to keys activated, to search for candidate combinations of characters corresponding to the keys activated, to rank order the candidate combinations according to the word bigram language model data and to provide feedback through the output device indicating at least a highest probability rank ordered candidate combination.

15. A method of processing keypad entry into alphanumeric text, comprising the steps of:

receiving input as a sequence of numeric values where each numeric value has a probability of representing any one of a plurality of characters;

converting the sequence of numeric values to at least one alphanumeric unit;

comparing the at least one alphanumeric unit with a dictionary to identify candidate words likely to represent the input;

assigning through word bigram data a probability to each of the candidate words; and displaying a candidate word having a highest probability data as determined by the word diagram data.

16. The method of claim 15, further comprising the step of:

editing the candidate word having the highest probability.

17. The method of claim 15, wherein the step of comparing the at least one alphanumeric unit with a dictionary is completed through use of a breadth-first search.

18. A device comprising:

a keypad, said keypad having an input area of discrete keys, each key representing a plurality of characters, and a display area, said input area configured to receive numeric input such that activation of a key generates an ambiguous input signal having a probability of representing any one of the plurality of characters for that key;

display processing circuitry for presenting a graphical image on the display;

a memory having at least alphanumeric recognition data stored therein; and digital processing circuitry for comparing the numeric input with the alphanumeric recognition data and for assigning word bigram probabilities to words represented by the alphanumeric recognition data, to provide to the display processing circuitry candidate recognition information including at least one likely candidate word representing having a highest probability of corresponding to the numeric input value as determined by the word bigram probabilities.

19. A device for text entry comprising:

a memory having instructions and data stored therein that, when executed, cause a digital processor to comprise:

an input;

a dictionary at least word bigram language model data;

a search algorithm, to search the dictionary for combinations of characters and words corresponding to digits received at the input to provide candidate combinations and words;

a rank ordering function that rank orders the candidate combinations and words according to the word bigram language model data; and an output to provide feedback indicating at least a highest rank ordered candidate combination or word.

* * * * *